UNITED STATES PATENT OFFICE.

DELLA L. CLARK, OF BIRMINGHAM, ALABAMA.

TIRE-FILLER.

1,083,188. Specification of Letters Patent. Patented Dec. 30, 1913.

No Drawing. Application filed September 18, 1912. Serial No. 720,994.

*To all whom it may concern:*

Be it known that I, DELLA L. CLARK, citizen of the United States, residing at Birmingham, in the county of Jefferson and State of Alabama, have invented new and useful Improvements in Tire - Fillers, of which the following is a specification.

This invention relates to a process of producing rubber-like substances possessing tensile strength, durability, elasticity and resiliency, and capable of use for many purposes as a substitute for rubber, and particularly as an elastic filler for pneumatic tires.

The object of the invention is to provide a substance of the character described which will be highly resilient, which will not harden or otherwise deteriorate from age or continuous use, and which may be conveniently molded or filled into a tire.

A further object of the invention is to provide a process of manufacture whereby a composition of this character may be readily and efficiently made.

The improved composition consists substantially of glue, 100 pounds, gelatin 100 pounds, glycerin 200 pounds, pure india rubber 100 pounds, water 200 pounds, potassium chromate about 1.56 pounds, lamp black .015 pound, wood tar 25 pounds, formaldehyde 1 pound, hydrogen peroxid 2 pounds, ground cork sufficient to constitute 5% of the mass, and molasses. These proportions, while approximately necessary, may be varied to a certain extent according to the amount of elasticity required and to other variations in the product according to the uses to which it is to be put.

In preparing the composition, the potassium chromate and lamp black are first mixed with molasses, in the proportion of 1 pound of the chromate to a quart of molasses. I then add thereto the formaldehyde, combined with water in the proportion of 10 ounces of formaldehyde to 3 ounces water, and afterward add to the mixture the rubber or caoutchouc dissolved in naphtha, oil of turpentine or other suitable solvent. I now take the glue, gelatin and water and place the same in a vat, the glue and gelatin being allowed to soak in the water for a period of half a day. When the composition is to be made, the glycerin is placed in a steam jacketed kettle and heated to the boiling point of water, after which the mixture of glue and gelatin is added thereto, the whole being stirred without intermission and heated to the boiling point until the ingredients are thoroughly combined. The hydrogen peroxid, formaldehyde and wood tar are then added, after which the rubber solution is added, while the composition is being vigorously stirred. I then add to the mixture the ground cork and thoroughly stir all the ingredients together, after which the composition so far prepared is drawn off into molds or onto conveniently sized slabs for storage for future use.

When it is desired to use the composition above made, a desired amount is placed in a steam jacketed kettle or other convenient vessel and heated to a temperature about 170° F., after which the mixture of potassium chromate, lamp black and molasses is added thereto and thoroughly combined therewith. The composition thus finally prepared is now ready to be forced under pressure into a tire, form or mold, after which it is heated to a temperature of about 150° F. for a period of about 5 hours, or until the ingredients are thoroughly cooked and the moisture driven off.

In filling automobile tires the usual air valve may be replaced by a tube of larger diameter, so that the composition in a liquid condition may flow freely into the tire under a pressure of from 60 to 90 pounds per square inch. After the composition solidifies it has substantially the density or consistency of rubber, is similar thereto in appearance, and possesses practically all the characteristics of rubber in point of tensile strength, durability, in elasticity and resiliency.

The wood tar is an important element in this combination as it serves to toughen the composition and to impart to the same the appearance of rubber. The formaldehyde prevents fermentation of the ingredients of the composition, and at the same time gives it a leathery consistency.

It is well known that compositions of glue, gelatin and potassium chromate are liable to become hardened and brittle, and that on account of the presence of sulfites in glue and gelatin the composition is liable to set very rapidly under the action of the chromate, when the sulfites come in contact therewith. By the use of the wood tar, rubber and molasses, this tendency of the composition to become hard and brittle is overcome and the composition caused to retain a permanently high degree of elasticity and resiliency, while the molasses also acts as a retarding agent to check the setting of the composition until it can be molded. The hydrogen peroxid acts as a neutralizing agent to also prevent the sudden setting of the mixture when the potassium chromate comes in contact with any sulfites which may be presented in the mass.

I claim:—

1. A rubber substitute containing glue, gelatin, glycerin, rubber, potassium chromate, wood tar, formaldehyde, and hydrogen peroxid in proportions suitable for forming a rubber substitute.

2. A rubber substitute consisting essentially of glue, gelatin, glycerin, rubber, potassium chromate, wood tar, formaldehyde, hydrogen peroxid and molasses in proportions suitable for forming a rubber substitute.

3. A rubber substitute containing the following ingredients in substantially the proportions named, to wit: glue 100 lbs., gelatin 100 lbs., glycerin 200 lbs., rubber 100 lbs., water 200 lbs., potassium chromate 1.56 lbs., wood tar 25 lbs., formaldehyde 1 lb., hydrogen peroxid 2 lbs., and molasses sufficient to dissolve the chromate.

4. The herein described process of producing the rubber-like substance herein described, which consists in first making a solution of potassium chromate and molasses sufficient in amount to dissolve the chromate, adding thereto a solution of formaldehyde and water, adding to the mixture thus produced rubber or caoutchouc dissolved in a suitable solvent, making a mixture of glue, gelatin and water, heating glycerin to the boiling point of water, adding thereto the mixture of glue, gelatin and water and thoroughly stirring the mass, adding thereto the formaldehyde, and rubber solutions, and the hydrogen peroxid and wood tar, thoroughly stirring and mixing the mass, allowing the mass to cool and solidify, liquefying the mass by the action of heat, adding thereto the mixture of potassium chromate and molasses, and heating the mass at a predetermined pressure for a determined period.

5. A composition of the character described formed of the following ingredients in substantially the proportions named, to wit: glue 100 pounds, gelatin 100 pounds, glycerin 200 pounds, rubber 100 pounds, water 200 pounds, potassium chromate 1.56 pounds, lamp black, .015 pound, wood tar 25 pounds, formaldehyde 1 pound, hydrogen peroxid 2 pounds, molasses sufficient to dissolve the chromate, and cork about 5% of the mass.

In testimony whereof I affix my signature in presence of two witnesses.

DELLA L. CLARK.

Witnesses:
    IVEY F. LEWIS,
    HENRY A. CLARK.